United States Patent Office 2,909,529
Patented Oct. 20, 1959

2,909,529

PROCESS FOR PREPARING 3,4-DIHYDRO-1,2-PYRANO-(3,4-c)-PYRIDONE-(6)

Jan Thesing, Trautheim ueber Darmstadt, Germany, assignor to E. Merck Aktiengesellschaft, Darmstadt, Darmstadt, Germany, a corporation of Germany No Drawing. Application July 15, 1957
Serial No. 671,702

Claims priority, application Germany July 19, 1956

1 Claim. (Cl. 260—297)

This invention relates to α-pyridones. In particular it is directed to a novel method of manufacturing α-pyridones.

α-Pyridones can be obtained, for example from α-pyrones by means of ammonia or amines; from pyridines or N-substituted pyridinium salts by oxidation; and also from certain α-substituted pyridines by conversion of the α-substituent into an OH group. While these syntheses are useful only in specific, especially simple cases due to the limited availability of the starting materials, certain closed ring reactions are of more general importance. For instance, the reaction of β-dicarbonyl-compounds with cyanoacetamide, cyanoacetic ester or malonic ester and ammonia produces 3-substituted α-pyridones. However, these methods have the disadvantage that they are not suitable for the manufacture of 4-substituted α-pyridones with a free 6-position; and that when unsymmetrically substituted β-dicarbonyl-compounds are used, mixtures of isomeric reaction products are produced.

Furthermore, the reaction of α,β-unsaturated carbonyl-compounds with cyanoacetic ester results in the formation of dihydropyridones-(2), which must be dehydrogenated in a further stage of the synthesis. This two-stage method is also too complicated for most syntheses. Inasmuch as α-pyridones, due to their great reactive capacity are suitable as starting material for very many and different further reactions, there is need for a generally applicable synthesis which is free of the aforementioned limitations.

According to the present invention, α-pyridones can be produced in a simple manner and with a high yield by the addition, in the manner of a Michael-addition, of N-(aminoformyl-methyl)-pyridinium salts (under the influence of basic catalysts, as for example, sodium hydroxide, sodium carbonate, sodium acetate or dimethylamine to α,β-unsaturated carbonyl compounds, and transforming the compounds thus obtained to α-pyridones by heating alone or in solution. Instead of pyridinium salts, other cyclammonium salts can also be used, as for instance, quinolinium-, isoquinolinium, or pyridinium salts, nuclearly substituted by hydrocarbon residues. Furthermore, the new pyridone-synthesis can also be carried out with N-(aminoformyl-methyl)-cyclammonium salts, (as for instance, N-(N'-methyl-aminoformyl-methyl)-pyridinium-chloride) monosubstituted at the nitrogen of the acid amide group. The substituent may be an alkyl-, alkylene-, aryl-, aralkyl-, hydroxyl-, amino- or a heterocyclic residue.

As the α-β-unsaturated carbonyl-compounds there can be used aliphatic, aromatic or heterocyclic α,β-unsaturated aldehydes or ketones or substances which are readily transformed into such α,β-unsaturated carbonyl-compounds, as for instance, aldols or Mannich-bases derived from aldehydes or ketones.

One thus obtains from α,β-unsaturated aldehydes, depending upon the constitution of the aldehyde, 4- or 5-substituted α-pyridones with free 6-position; whereas from α,β-unsaturated ketones, 6-substituted pyridones are always obtained which in addition may be substituted in the 4- or 5-positions. Mannich-bases derived from ketones produce, by this pyridone synthesis, 6- or 5,6-substituted α-pyridones, but the reaction of N-(aminoformyl-methyl)-cyclammonium salts with Mannich-bases from aldehydes produce 5-substituted α-pyridones.

Pyridones conveniently obtainable in this manner may be used, for instance as intermediate products for further syntheses of alkaloids and pharmaceuticals, especially for producing pyridine-derivatives which are not, or at least not readily, available by other methods.

The following are examples in accordance with this invention:

Example 1

1.32 g. of cinnamaldehyde, 1.72 g. of N-(aminoformyl-methyl)-pyridinium chloride and 0.68 g. of 33% aqueous dimethylamine solution are heated to the boiling point in 25 cc. of methanol for two hours while being refluxed; then evaporated until dryness; and the residue is molten for five minutes at 210° to 220° C. The melt is cooked out with benzene. When the benzene cools, 4-phenyl-pyridone-(2) precipitates in form of colorless needles. It melts after being recrystallized from methanol, at 227° to 228° C.

Example 2

A solution of 1.04 g. of benzalacetophenone and 0.86 g. of N-(aminoformyl-methyl)-pyridinium-chloride in 15 cc. of methanol is mixed with 5 cc. of 1 N-caustic soda, whereby a yellow crystallized deposit is precipitated after a few minutes. Yield: 1.55 g. (90% of the theory); from acetone yellow needles having a melting point of 147° C.

The raw betaine thus obtained is heated with an equimolecular volume of glacial acetic acid for the minutes to 150° C., and then the reaction mixture is cooked out with acetone. The 4,6-diphenyl-pyridone-(2), deposited after cooling of the mixture, melts after being recrystallized from acetone at 208° to 209° C.

Example 3

N-methyl-4,6-diphenyl-pyridone-(2) is obtained analogously to Example 1 from benzalacetophenone and N-(N'-methylaminoformyl-methyl)-pyridinium-chloride. It melts after being recrystallized from petroleum ether at 91° C.

Example 4

11.2 g. of 3-formyl-5,6-dihydropyrane (readily obtainable according to U.S. Patent 2,514,156), 17.3 g. of N-(aminoformyl-methyl)-pyridinium-chloride and 8.2 g. of sodium acetate are kept at the boiling point for 45 minutes in 300 cc. of alcohol. Then the mixture is filtered off from the deposited sodium chloride; and the filtrate is evaporated. The residue is heated in 75 cc. of formamide for three hours at 170° C. and the 3,4-dihydro-1-pyrano-(3,4-c)-pyridone-(6). It is obtained by shaking out the reaction mixture with chloroform; melting point 237° C.

Example 5

A solution of 0.86 g. of N-(aminoformyl-methyl)-pyridinium-chloride and 1.05 g. of 1,3-bis-(pyridyl-3)-1-propen-2-one (obtained by the condensation of nicotinaldehyde and 3-acetyl-pyridine in aqueous solution at room temperature and in the presence of caustic soda or soda; melting point 143° C.) are mixed in 25 cc. of methanol with 6.2 cc. of 0.8 N-methanolic caustic soda; and the reaction mixture is stirred for half an hour at room temperature. The mixture is then acidified with acetic acid and the solvent evaporated, whereby ring closure to form the pyridone takes place. For purification, the residue is sublimed in vacuum. Yield, 1.0 g. (80% of the theory)

of 4,6-bis-(pyridyl-3)-pyridone-(2) having a melting point of 270°–280° C. From water the substance is obtained with the melting point 282° C.

*Example 6*

A solution of 1.72 g. of N-(aminoformyl-methyl)-pyridinium-chloride and 1.55 g. of 2-dimethylamino-methyl-cyclohexanone-(1) in 40 cc. of methanol is heated to 65° C. while nitrogen is passed through the solution and the solvent is allowed to evaporate until dryness. The residue is heated for 10 minutes to 210° to 220° C. and cooked out with water. The 5,6,7,8-tetrahydro-carbostyril after being recrystallized from water melts at 202°–204° C.

*Example 7*

A solution of 1.72 g. of N-(aminoformyl-methyl)-pyridinium chloride and 1.77 g. of omega-dimethylamino-propiophenone in 40 cc. of methanol is heated to 65° C. while nitrogen is passed therethrough; and the solvent is allowed to evaporate until dryness. The residual red grease is heated to 210° to 220° C. for ten minutes and cooked out with benzene. After cooling of the benzene, 6-phenyl-pyridone-(2) is deposited, which melts at 197° C. after being recrystallized from benzene.

Instead of using omega-dimethylamino-propiophenone, the 6-phenyl-pyridone-(2) can also be obtained under the same conditions from the corresponding aldol, i.e., the omega-hydroxy-propiophenone obtained from acetophenone and formaldehyde.

It will be understood that the foregoing description of the invention and the examples set forth are merely illustrative of the principles thereof. Accordingly the appended claim is to be construed as defining the invention within the full spirit and scope thereof.

I claim:

A process of manufacturing 3,4-dihydro-1,2-pyrano-(3,4-c)-pyridone-(6), comprising the steps of reacting 3-formyl-5,6-dihydropyrane-(1,2) with N-(aminoformyl-methyl)-pyridinium-chloride in the presence of a basic compound, and subjecting the addition product thus obtained to a cyclisation by heating.

References Cited in the file of this patent
FOREIGN PATENTS 369,946    Great Britain _____ Mar. 24, 1932